United States Patent
An et al.

(10) Patent No.: US 7,836,709 B2
(45) Date of Patent: Nov. 23, 2010

(54) REFRIGERATOR, MONITORING SYSTEM HAVING REFRIGERATOR AND CONTROL METHOD THEREOF

(75) Inventors: Gyu-hwan An, Gwangju (KR); Gi-hyeong Lee, Gwangju (KR); Kyoung-whan Kim, Gwangju (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1106 days.

(21) Appl. No.: 11/519,944

(22) Filed: Sep. 13, 2006

(65) Prior Publication Data
US 2007/0064106 A1  Mar. 22, 2007

(30) Foreign Application Priority Data
Sep. 21, 2005  (KR) .................. 10-2005-0087523

(51) Int. Cl.
*F25B 49/00* (2006.01)
*G05D 23/00* (2006.01)
*H04N 7/18* (2006.01)

(52) U.S. Cl. .................. 62/126; 62/127; 234/94; 165/11.2; 348/143

(58) Field of Classification Search .................. 62/126, 62/127, 129; 236/94; 165/11.1, 11.2; 348/143
See application file for complete search history.

(56) References Cited

U.S. PATENT DOCUMENTS

| 6,644,046 B2 * | 11/2003 | Roh et al. .................. 62/126 |
| 2001/0025497 A1 * | 10/2001 | Roh et al. .................. 62/125 |
| 2004/0154318 A1 * | 8/2004 | Roh et al. .................. 62/126 |
| 2004/0216471 A1 * | 11/2004 | Kim et al. .................. 62/126 |

FOREIGN PATENT DOCUMENTS

| KR | 2002-94149 | 12/2002 |
| KR | 2004-98129 | 11/2004 |

* cited by examiner

*Primary Examiner*—Marc E Norman
(74) *Attorney, Agent, or Firm*—Staas & Halsey LLP

(57) ABSTRACT

A refrigerator for monitoring the status of another space by means of a display device mounted to the refrigerator, a monitoring system having the refrigerator and a control method thereof. The refrigerator includes a body which is formed with a storage chamber, a door for opening and closing the storage chamber, and a display device which is mounted to a front side of the door, the display device having a receiving part for receiving a monitoring image signal from a predetermined outside signal supply source, an image signal processing part for processing the received monitoring image signal, a display part for displaying the monitoring image signal and a control part for controlling the image signal processing part so that the received monitoring image signal is displayed on the display part.

5 Claims, 4 Drawing Sheets

REFRIGERATOR, MONITORING SYSTEM HAVING REFRIGERATOR AND CONTROL METHOD THEREOF

CROSS-REFERENCE TO RELATED APPLICATIONS

This application claims priority from Korean Patent Application No. 2005-0087523, filed on Sep. 21, 2005, in the Korean Intellectual Property Office, the disclosure of which is incorporated herein by reference.

BACKGROUND OF THE INVENTION

1. Field of the Invention

The present invention relates to a refrigerator, a monitoring system having the refrigerator and a control method thereof, and more particularly to a refrigerator having a display device, a monitoring system having the refrigerator and a control method thereof.

2. Description of the Related Art

Generally, a refrigerator has a body which is formed with a storage chamber and a door for opening and closing the storage chamber. Such a refrigerator has not only functions for storing and keeping foods but also various additional functions.

Especially, a recent refrigerator is equipped with a display device in a front side of a door thereof to support additional functions for TV, Internet and so on. Further, it may be provided to display image signal which is inputted from a predetermined outside signal supply sources such as a DVD player, a VTR player and so on to the display device.

Meanwhile, if a user is in the place where a refrigerator is installed, it is inconvenient for the user to monitor the status of each of spaces which are out of view of the user, in particular, which need safety.

SUMMARY OF THE INVENTION

Additional aspects and/or advantages of the invention will be set forth in part in the description which follows and, in part, will be apparent from the description, or may be learned by practice of the invention.

Accordingly, it is an aspect of the present invention to provide a refrigerator for monitoring the status of another space by means of a display device mounted to the refrigerator, a monitoring system having the refrigerator and a control method thereof.

The foregoing and/or other aspects of the present invention can be achieved by providing a refrigerator including: a body which is formed with a storage chamber; a door for opening and closing the storage chamber; and a display device which is mounted to a front side of the door, the display device having a receiving part for receiving a monitoring image signal from a predetermined outside signal supply source, an image signal processing part for processing the received monitoring image signal, a display part for displaying the monitoring image signal and a control part for controlling the image signal processing part so that the received monitoring image signal is displayed on the display part.

According to an aspect of the present invention, the refrigerator further includes a user selecting part, the control part allowing the image signal processing part to process the received monitoring image signal and display the processed monitoring image signal on the display part when a monitoring display function is selected from the user selecting part.

According to an aspect of the present invention, the receiving part includes a wireless communication module for receiving a predetermined wireless signal.

According to an aspect of the present invention, the wireless communication module is communicated according to the Institute of Electrical and Electronics Engineers (IEEE) Protocol 802.11A.

According to an aspect of the present invention, the display device is detachably mounted to the door.

According to an aspect of the present invention, the display device includes a home pad.

The foregoing and/or other aspects of the present invention can be achieved by providing a method for controlling a refrigerator having a receiving part, an image signal processing part and a display part, including: receiving a monitoring image signal from a predetermined outside signal supply source; and processing the received monitoring image signal through the image signal processing part and displaying the processed monitoring image signal on the display part when selecting a monitoring display function.

According to an aspect of the present invention, the receiving part includes a wireless communication module for receiving a predetermined wireless signal.

According to an aspect of the present invention, the wireless communication module is communicated according to the IEEE Protocol 802.11A.

The foregoing and/or other aspects of the present invention can be achieved by providing a monitoring system having a refrigerator, including: a camera part; a transmitting part for transmitting a monitoring image signal taken by the camera part; and a refrigerator having a body which is formed with a storage chamber, a door for opening and closing the storage chamber and a display device which is mounted to a front side of the door, the display device having a receiving part for receiving the monitoring image signal from the transmitting part, an image signal processing part for processing the received monitoring image signal, a display part for displaying the monitoring image signal and a control part for controlling the image signal processing part so that the received monitoring image signal is displayed on the display part.

According to an aspect of the present invention, the monitoring system further includes a user selecting part, the control part allowing the image signal processing part to process the received monitoring image signal and display the processed monitoring image signal on the display part when a monitoring display function is selected from the user selecting part.

According to an aspect of the present invention, the transmitting part and the receiving part include a wireless communication module for receiving a predetermined wireless signal.

According to an aspect of the present invention, the wireless communication module is communicated according to the IEEE Protocol 802.11A.

According to an aspect of the present invention, the display device is detachably mounted to the door.

According to an aspect of the present invention, the display device includes a home pad.

According to an aspect of the present invention, the camera part includes a plurality of cameras, the monitoring system further includes a screen selector for processing the monitoring image signals from the plurality of cameras and outputting the processed monitoring image signals to the transmitting part, the screen selector including a signal processing part for processing the monitoring image signal, a function selecting part for selecting any one of a division display function for processing to simultaneously display the monitoring image signals from the plurality of cameras and a converting display function for processing to sequentially display the monitoring image signals from the plurality of cameras, and a selector controlling part for allowing the signal processing part to process the monitoring image signal and to output the processed monitoring image signals to the transmitting part according to the selection of the function selecting part.

The foregoing and/or other aspects of the present invention can be achieved by providing a method for controlling a monitoring system having a camera, a transmitter and a refrigerator, including: taking an image through the camera: transmitting a monitoring image signal taken by the camera through the transmitter; receiving the monitoring image signal through the refrigerator; and displaying the received monitoring image signal on a predetermined display device provided in the refrigerator when selecting a monitoring display function.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings, in which.

DETAILED DESCRIPTION OF THE PREFERRED EMBODIMENTS

Figure 1:
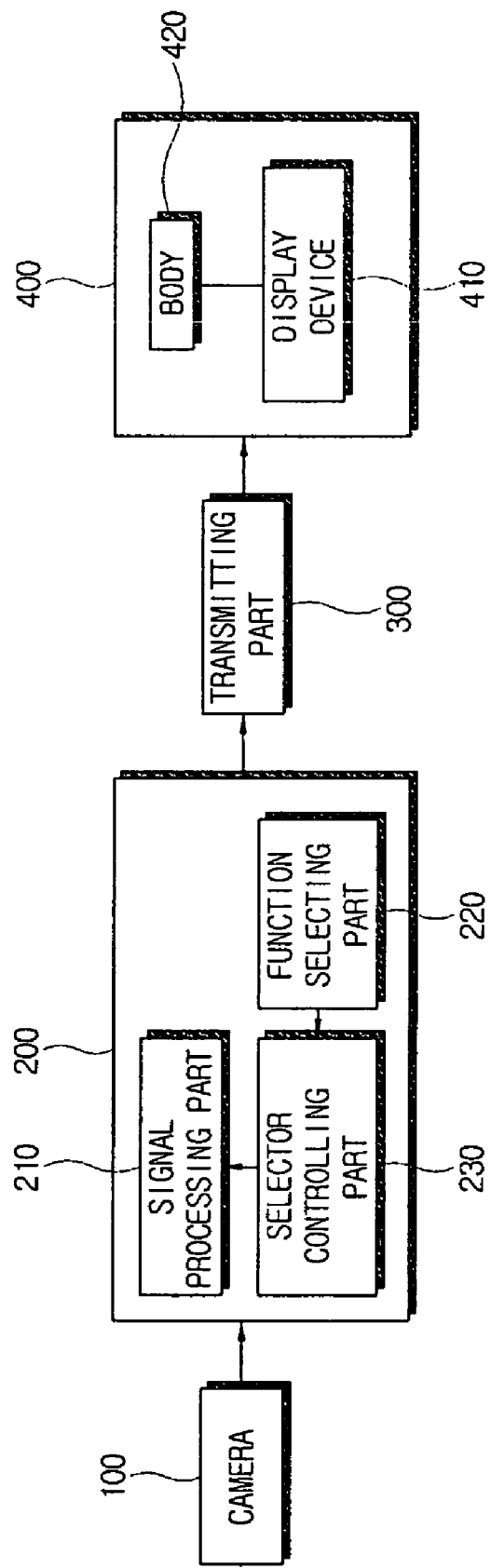
FIG. 1 is a block diagram of a monitoring system according to an embodiment of the present invention.

Reference will now be made in detail to the embodiments of the present invention, examples of which are illustrated in the accompanying drawings, wherein like reference numerals refer to like elements throughout. The embodiments are described below so as to explain the present invention by referring to the figures.

FIG. 1 is a block diagram of a monitoring system according to an embodiment of the present invention. Referring to FIG. 1, the monitoring system includes a camera part 100, a transmitting part 300 and a refrigerator 400.

The camera part 100 may be installed in a place which needs monitoring. The camera part 100 takes an image in the place where the camera is installed. Then, a monitoring image signal taken by the camera part 100 is provided to the transmitting part 300 which will be described later.

Here, the camera part 100 is provided with a plurality of cameras, whereby each of the cameras may take an image. Further, in case of installing a plurality of cameras, there is provided a screen selector 200 for processing so that the monitoring image signals which are taken by the plurality of cameras are simultaneously displayed on single screen or for processing so that the monitoring image signals are sequentially displayed and then for providing the processed monitoring image signals to the transmitting part 300.

Here, the screen selector 200 includes a signal processing part 210 for processing the monitoring image signal taken by each of the cameras, a function selecting part 220 for selecting one of a division display function for simultaneously displaying the monitoring image signal on single screen and a sequential display function for sequentially displaying the monitoring image signal, a selector controlling part 230 for allowing the signal processing part 210 to process the monitoring image signal and to provide the processed monitoring image signal to the transmitting part 300 according to the result selected by the function selecting part 220.

As such, the monitoring image signal provided from the camera part 100 or the screen selector 200 is transmitted through the transmitter 300 to the refrigerator 400. Here, the transmitting part 300 may include a wireless communication module which communicates according to a wireless communication rule of the Institute of Electrical and Electronics Engineers (IEEE) Protocol 802.11A.

Then, the transmitted monitoring image signal is received by the display device 410 provided in the refrigerator 400. If a user selects the monitoring display function, the display device 410 displays the received monitoring image signal.

The refrigerator 400 according to an embodiment of the present invention will be described in detail with reference to a block diagram of FIG. 2.

Figure 2:
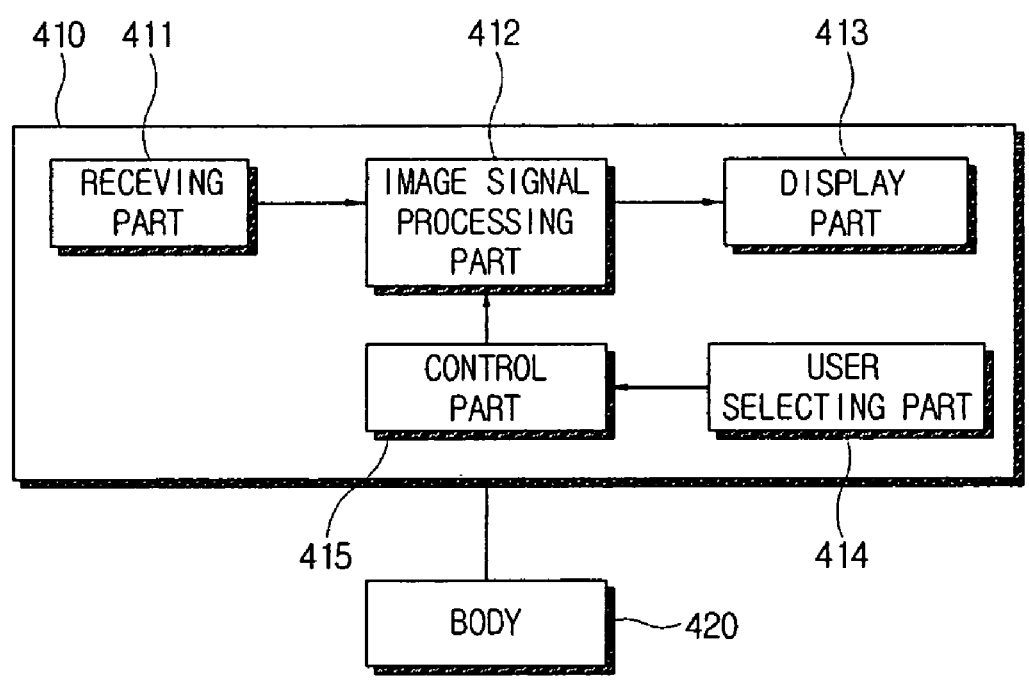
FIG. 2 is a block diagram of a refrigerator according to an embodiment of the present invention.

Referring to FIG. 2, the refrigerator according to the present invention includes a body 420 which is provided with a storage chamber, a door (not shown) for opening and closing the storage chamber, and a display device 410 which is embodied in the detachable type and is operated by a predetermined power from the body 420.

The display device 410 which may be embodied as a home pad includes a receiving part 411, an image signal processing part 412, a display part 413, a user selecting part 414 and a control part 415.

The receiving part 411 of the display device 410 according to the present invention receives image signals transmitted form various outside sources such as TV, Internet and so on, wherein, in particular, the receiving part 411 may include a monitoring receiving part for receiving a monitoring image signal. Here, the receiving part 411 may receive a monitoring image signal through a wireless communication module according to a wireless communication rule of IEEE 802.11A.

Then, the received monitoring image signal is displayed on the display part 413 through the processing process of the image signal processing part 412. The image signal processing part 412 includes a scaler for causing the monitoring image signal to be converted to correspond to vertical frequency, resolution, screen proportion and so on according to the power output standard of the display part 413. The display part 413 receives the monitoring image signal processed by the image signal processing part 412 and displays the processed signal as an image. The display part 413 may be embodied as various typed display modules such as Digital Light Processing (DLP), Liquid Crystal Display (LCD), Liquid Crystal On Silicon (LCOS), Plasma Display Penal (PDP) and so on.

The user selecting part 414 has a key and so on for selecting the function of the outside source or the refrigerator 400 and may include a menu key which is provided in a remote controller or a casing and a key signal generating part for generating a key signal corresponding to key manipulation. For example, if the user selects the monitoring display function using the user selecting part 414, the received monitoring image signal is displayed.

The control part 415 receives the key signal from the user selecting part 414 and control to perform the correspondent function and may be embodied by a controller such as a microcomputer and so on. That is, if the monitoring display function is selected from the user selecting part 414, the control part 415 allows the image signal processing part 412 to process the received monitoring image signal and to display the processed signal on the display part 413.

Figure 3:
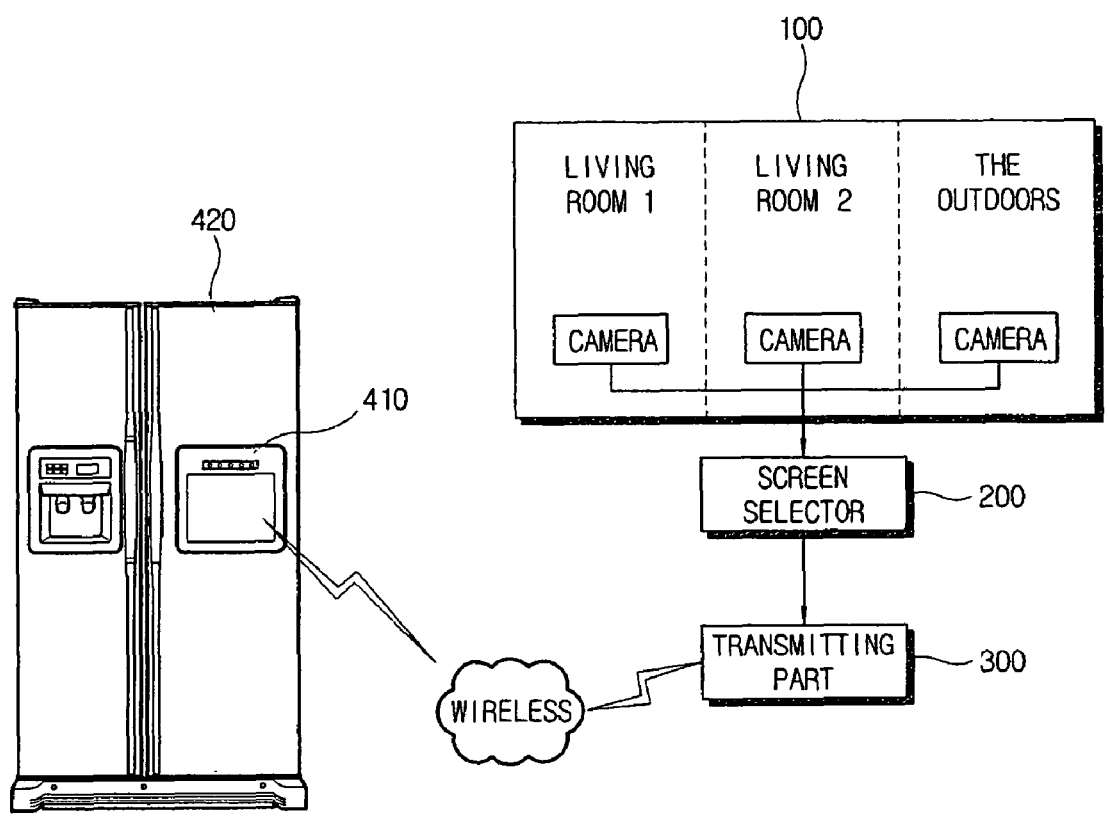
FIG. 3 is a perspective view of a monitoring system according to an embodiment of the present invention.

FIG. 3 is a perspective view of a monitoring system according to an embodiment of the present invention. Here, when explaining the embodiment of the present invention with reference to FIG. 3, like reference numerals refer to like elements throughout FIGS. 1 to 3, and the detailed explanation thereof will be omitted, if necessary.

FIG. 3 shows three cameras which are installed in a living room 1, a living room 2 and the outdoors, respectively. The respective camera monitors the relevant place and the monitoring image signal taken by the camera is processed through the screen selector 200 and then is transmitted through the transmitter 300 to the refrigerator 400 by wireless. Here, the user can set to simultaneously display the monitoring image signals taken by three cameras on single screen or to sequentially display them using the screen selector 200.

Then, the display device 410 which is provided in the body 420 of the refrigerator 400 receives the monitoring image signal by wireless. Then, if the user selects the monitoring display function using the user selecting part 414 provided in the display device 410 to monitor the respective status of the living room 1, the living room 2 and the outdoors in the kitchen which is equipped with the refrigerator 400, the display device 410 displays the received monitoring image signal.

Thus, the user can monitor the status of another space, while working in the place where the refrigerator 400 is equipped.

A method for controlling the above described system of the refrigerator 400 will be explained with reference to a flow chart in FIG. 4.

Figure 4:
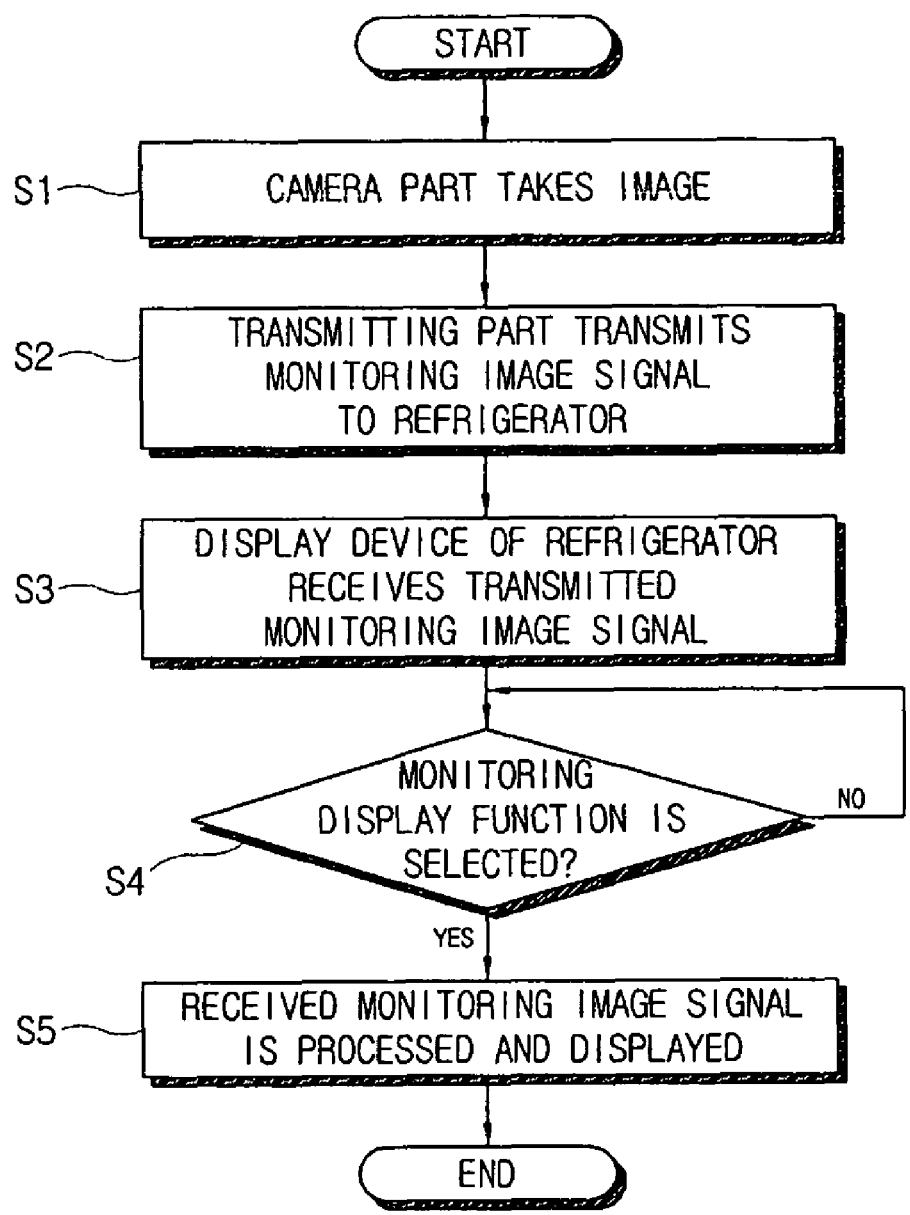
FIG. 4 is a flow chart showing a control method of a monitoring system according to an embodiment of the present invention.

Referring to FIG. 4, the camera part 100 is installed in a desired place to be monitored and takes an image in the place at operation S1.

As described above, the camera part 100 may include one or a plurality of cameras. For example, if the camera part 100 includes one camera, a monitoring image signal taken by one camera is provided to the transmitter 300. Further, if the camera part 100 includes a plurality of cameras, there is provided a screen selector 200 for processing the monitoring image signals which are taken by the plurality of cameras to be simultaneously displayed on single screen or to be sequentially displayed and then providing the processed signals to the transmitting part 300.

Then, the monitoring image signal taken by the camera part 100 or the screen selector 200 is transmitted through the transmitter to the refrigerator 400 at operation S2.

Then, the transmitted monitoring image signal is received by the receiving part 411 of the display device 410 which is provided in the refrigerator 400 at operation S3.

Then, if the monitoring display function is selected from the user selecting part 414 at operation S4, the display device 410 allows the image signal processing part 412 to process the received monitoring image signal and to display the processed signal at operation S5.

From the foregoing, according to the present invention, there is provided a refrigerator for monitoring the status of another space through a display device mounted to the refrigerator, a monitoring system having the refrigerator and a control method thereof.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A monitoring system having a refrigerator, comprising:
   a camera part comprising a plurality of cameras;
   a transmitting part for transmitting a monitoring image signal taken by the camera part;
   a refrigerator having a body which is formed with a storage chamber, a door for opening and closing the storage chamber and a display device which is mounted to a front side of the door, the display device having a receiving part for receiving the monitoring image signal from the transmitting part, an image signal processing part for processing the received monitoring image signal, a display part for displaying the monitoring image signal and a control part for controlling the image signal processing part so that the received monitoring image signal is displayed on the display part; and
   a screen selector for processing the monitoring image signals from the plurality of cameras and outputting the processed monitoring image signals to the transmitting part,
   wherein the screen selector comprises
      a signal processing part for processing the monitoring image signal,
      a function selecting part for selecting any one of a division display function for processing to simultaneously display the monitoring image signals from the plurality of cameras and a converting display function for processing to sequentially display the monitoring image signals from the plurality of cameras, and
      a selector controlling part for allowing the signal processing part to process the monitoring image signal and to output the processed monitoring image signals to the transmitting part according to the selection of the function selecting part.

2. The monitoring system according to claim 1, further comprising a user selecting part, the control part allowing the image signal processing part to process the received monitoring image signal and display the processed monitoring image signal on the display part when a monitoring display function is selected from the user selecting part.

3. The method according to claim 1, wherein the transmitting part and the receiving part comprise a wireless communication module for receiving a predetermined wireless signal.

4. The monitoring system according to claim 1, wherein the display device is detachably mounted to the door.

5. The monitoring system according to claim 1, wherein the display device comprises a home pad.

* * * * *